United States Patent [19]

Hackleman et al.

[11] Patent Number: 4,670,059

[45] Date of Patent: Jun. 2, 1987

[54] INCREASED SOLUBILITY OF CARBON BLACK

[75] Inventors: David E. Hackleman, Monmonth; Loren E. Johnson; Kenneth A. Norton, both of Corvallis, all of Oreg.

[73] Assignee: Hewlett Packard Company, Palo Alto, Calif.

[21] Appl. No.: 828,424

[22] Filed: Feb. 11, 1986

[51] Int. Cl.$^4$ ............................................. C09C 1/56
[52] U.S. Cl. .................................. 106/307; 428/405
[58] Field of Search .......................... 106/307; 428/405

[56] References Cited

U.S. PATENT DOCUMENTS 4,530,961 7/1985 Nguyen et al. ...................... 524/832

OTHER PUBLICATIONS

Derwent Abstract Accession No. 78-77089A/43, Japanese Patent No. J53106648, Sep. 16, 1978.

*Primary Examiner*—Amelia B. Yarbrough
*Attorney, Agent, or Firm*—William J. Bethurum

[57] ABSTRACT

A process for increasing the solubility of carbon black in desired solvents is provided. The process comprises (a) forming a suspension of the carbon black in a non-reactive medium, such as an aromatic hydrocarbon, (b) adding a silylating agent, such as an organosilane, (c) removing the reaction product of the silating agent and the carbon black, and (d) forming a dispersion of the reaction product in a solvent for use as an ink-jet printing fluid.

The increased dispersibility of the carbon black of the invention results in a more non-settling suspension of the carbon black "molecules" than otherwise obtained.

17 Claims, No Drawings

INCREASED SOLUBILITY OF CARBON BLACK

BACKGROUND OF THE INVENTION

This invention relates to inks for ink-jet printers, and, more particularly, to a process for increasing the solubility of carbon black in such inks.

Carbon black is a variable particle size material which is comprised basically of carbon, with variable attached functional groups. It is insoluble in all fluids, but will remain in suspension for extended periods of time in some fluids.

Carbon black is an indelible, very opaque printing material. It does not react with papers or copying machines. No photochemical decomposition occurs, and hence it is an acceptable archival printing material. Most ink-jet fluids do not meet these criteria.

Size-selected carbon olack is easy to purify to remove unwanted material; thus, it is superior to dyemolecule-based inks in this regard.

Although carbon black has several desirable properties that make it a prime candidate for ink compositions used in ink-jet printing, nevertheless, carbon black suspensions are easily susceptible to evaporation of the carrier fluid and readily precipitate out of the suspension. This propensity to precipitate limits the usefulness of carbon black in ink-jet fluids.

SUMMARY OF THE INVENTION

Accordingly, it is an object of the invention to provide a process for reducing the propensity of carbon black to precipitate out of ink-jet fluids.

It is a further object of the invention to provide a process which increases the solubility, specifically, the dispersibility, of carbon black in ink-jet fluids.

These and further objects of the invention will become apparent from the hereinafter following commentary.

In accordance with the invention, the dispersibility of carbon black in ink-jet printing fluids is increased. The process comprises forming a suspension of carbon black in a non-reactive solvent, adding a silylating agent, removing the reaction product of the silylating agent and the carbon black, and forming a suspension of the reaction product in a solvent for use as an ink-jet printing fluid.

DETAILED DESCRIPTION OF THE INVENTION

The dispersibility of carbon black in fluids is increased in accordance with the process of the invention. In one sense, it appears that the solubility of the carbon black has been increases, and indeed, the fluid containing the carbon black appears more like a solution than a suspension, in that the carbon black particles do not readily settle out in time. However, the carbon black "molecules" do not dissolve in the fluid in the sense that molecules such as salt or sugar dissolve.

Briefly, the process of the invention comprises:

(a) forming a suspension of carbon black in a non-reactive solvent;

(b) adding a silylating agent;

(c) removing tne reaction product of the silylating agent and the carbon black; and (d) forming a suspension of the reaction product in a solvent for use as an ink-jet printing fluid.

The carbon black that is employed is that commercially available. However, it is desired that the particle size distribution be as uniform as possible. Further, the particle size of the carbon black should range between about 0.5 and 10 micrometers. Particles less than about 0.5 micrometers reflect light and thus exhibit color, which is undesirable for a black ink. Particles greater than about 10 micrometers may occlude the orifices of the ink-jet pen.

The fluid or medium in which the carbon black is first suspended is non-reactive. Examples include xylene (ortho-, meta-, and para- forms and mixtures of these), benzene and other aromatic hydrocarbons.

The amount of fluid employed is controlled by two considerations. First, there must be sufficient fluid so as to totally disperse the carbon black in the nonreactive fluid. Aggregation of the carbon particles should be avoided, since aggregation would adversely affect the silylation reaction. Second, the volume of the non-reactive fluid should be kept as low as possible, since following silylation, the fluid will be removed for recovery. Consistent with these considerations, the dispersion comprises a range of about 1 to 7% by weight of carbon black.

The dispersion is stirred by any convenient means, such as with a magnetic stirrer or by ultrasonic means, to obtain a substantially uniform dispersion. Typically, a substantially uniform dispersion is obtained in about 1 to 3 hours, usually within about 2 hours.

Following formation of the substantially uniform dispersion, a silylating agent is added to the dispersion. The silylating agent comprises an organo-silane with one or more polar adducts. A preferred example is hexamethyl disilizane, which has the formula $(CH_3)_3SiNHSi(CH_3)_3$.

The organo-silane molecule should not be too large, in order to minimize steric hindrance effects. Accordingly, the molecular weight of the organo-silane should be no greater than about 200.

An organo-silane having polar groups is employed as the silylating agent, in order to promote greater solubility in the solvents of choice (those utilized in the ink-jet printing fluid). Solvents of choice include water, glycols and alcohols, as discussed more fully below. Examples of desirable polar groups include —Cl, —Br, —$SO_3$, —OH, and —$NH_3$; examples of preferred organosilanes include dimethyl chlorosilane, tetramethyl disilizane, bromodimethylchlorosilane and N-methyl-N-trimethylsilane-acetamide.

As is well-known, the carbon black "molecule" has a considerable number of reaction sites, typically, dangling bonds. (The use of "molecule" in quotation marks is employed to suggest that the carbon black molecule is not well-defined or characterized.) Accordingly, it is desired to provide an excess of silylating agent molecules over the number of reaction sites (each reaction site on a carbon black "molecule" requiring one silylating agent molecule). As a rough measure, about one mole of silylating agent is conveniently employed for one liter of suspension, although less than one mole/liter may be so employed; simple experimentation may be use to determine the appropriate ratio.

The amount of silylating agent required in a specific case is readily determined. A small quantity of the suspension is silylated with the desired silylating agent. The silylating agent is added until, upon measurement, an excess of silylating agent is observed. For example, gas chromatography of any alcohol reacted with the remaining silylating agent and determining the quantity of alcohol used would indicate the amount of excess silylating agent.

The silylation reaction gives off heat, and the reaction is considered complete when no more heat is evolved. Typically, the reaction takes about 2 to 3 days for completion, although some silylation reactions can be considered fully complete in as little as 5 minutes and others may require 1 week at 100° C.

Heat may be added to speed up the reaction time. The maximum temperature is dictated by the boiling point of the solvent and preferably is maintained at least about 10° C. below the boiling point. Accordingly, the reaction may be exposed to temperatures in the range of about 25° to 180° C., depending on the particular silylating agent, and preferably is exposed to about 60° to 80° C.

During the course of the reaction, it appears that the silicon portion of the organo-silane attaches to a reactive site carbon on the carbon black "molecule", leaving the organic functional groups exposed for solubilization. Since the solvent of choice is water, one or more glycols, or one or more alcohols, it will be appreciated that polar functional groups compatible with such solvents are preferred.

Solvent extraction, employing the solvent of choice and well-known procedures, is used to strip the silylated carbon black from the non-reactive fluid. The non-reactive fluid remains in the organic phase, available for recycling and reuse, while the silylated carbon black is dispersed in the desired solvent.

The solvent of choice comprises water, one or more glycols or one or more alcohols or mixtures of these. Examples of suitable glycols include ethylene glycol, diethylene glycol, triethylene glycol and polyethylene glycol. Examples of suitable alcohols include those alcohols having from 1 to 10 carbon atoms, ranging from methanol to decanol. The solvent of choice may thus include any of the glycols and mixtures thereof, any of the alcohols and mixtures thereof, and with or without water.

For use of the dispersed carbon in a thermal inkjet printer, which involves heating the ink to an elevated temperature sufficient to vaporize the ink, the boiling point of the solvent preferably is no greater than about 400° C. Further, the solvent should be stable against plastics, glass, paper and other substrates whicn may be employed in the printing process.

The silylated carbon black "molecules" remain larger than the wavelength of visible light, and thus appear black. As a consequence of the process of the invention, a non-settling dispersion of carbon black is formed.

EXAMPLE

To 250 ml of mixed xylenes was added 13.2 g of carbon black known as Cabot Monarch, obtained from Cabot Corp., Boston, MA). The suspension was stirred overnight at room temperature with a magnetic stirrer. To the suspension was added 50 ml hexamethyl disilizane. A warming of the solution was observed. The solution was allowed to stir overnight.

The silylated carbon black was extracted with a solution comprising diethylene glycol and water in a molar ratio of 1:1. The silylated carbon black appeared to be more stable against settling than carbon black not so treated.

The silylated carbon black may be isolated, such as by washing in water of the filtered carbon black to react any remaining silylating agent and drying the powder. The dry powder could then be stored and shipped dry, and added to the solvent of choice at a latter time to make up the ink.

Thus, there has been disclosed a process for increasing the dispersibility of carbon in a solvent for use as an ink in ink-jet printers. Various modifications and changes will make themselves available to those of ordinary skill in the art, and all such changes and variances not deviating from the spirit and essence of the invention are intended to be covered by the appended claims.

What is claimed as:

1. A process for increasing the dispersibility of carbon black in a solvent which comprises:
   (a) forming a suspension of carbon black in a non-reactive medium;
   (b) adding a silylating agent;
   (c) removing any reaction product that forms as a consequence of the reaction of the silylating agent and the carbon black; and
   (d) forming a dispersion of the reaction product in a solvent.

2. The process of claim 1 in which the particle size of the carbon black ranges from about 0.5 to 10 micrometers and is substantially uniform.

3. The process of claim 1 in which the non-reactive medium comprises one or more aromatic hydrocarbons.

4. The process of claim 3 in which the non-reactive medium comprises at least one component selected from the group consisting of xylenes and benzene.

5. The process of claim 4 in which the non-reactive medium comprises at least one xylene.

6. The process of claim 1 in which the amount of carbon added to the non-reactive medium ranges from about 1 to 7 wt%.

7. The process of claim 1 in which the silylating agent comprises an organo-silane having at least one polar adduct.

8. The process of claim 7 wherein the polar adduct is one selected from the group consisting of —Cl, —Br, —SO$_3$, —OH and —NH$_3$.

9. The process of claim 8 in which the silylating agent comprises a compound selected from the group consisting of hexamethyl disilizane, dimethyl chlorosilane, tetramethyl disilizane, bromodimethylchlorosilane and N-methyl-N-trimethylsilane-acetamide.

10. The process of claim 1 in which an excess of silylating agent is added to the carbon black suspension on the basis of reactive sites on the carbon black "molecule".

11. The process of claim 1 in which the mixture of silylating agent and carbon black in the non-reactive medium is maintained at a temperature between about 25° and 180° C.

12. The process of claim 11 in which the temperature ranges from about 60° to 80° C.

13. The process of claim 1 in which the silylating reaction proceeds for time ranging from about 1 hour to 3 days.

14. The process of claim 1 in which the solvent comprises at least one member selected from the group consisting of water, glycols and alcohols.

15. The process of claim 14 in which the glycols are selected from the group consisting of ethylene glycol, diethylene glycol, triethylene glycol and polyethylene glycol.

16. The process of claim 14 in which the alcohols are selected from the consisting of alcohols having from 1 to 10 carbon atoms.

17. Product produced by the process of claim 1.

* * * * *